United States Patent [19]

Tanaka et al.

[11] Patent Number: 4,696,588
[45] Date of Patent: Sep. 29, 1987

[54] NON-SEPARABLE THRUST ROLLING BEARING

[75] Inventors: Yasuo Tanaka; Akio Niikura, both of Fujisawa, Japan

[73] Assignee: Nippon Seiko Kabushiki Kaisha, Tokyo, Japan

[21] Appl. No.: 846,268

[22] Filed: Mar. 31, 1986

[30] Foreign Application Priority Data

Mar. 29, 1985 [JP] Japan .................................. 60-46167

[51] Int. Cl.⁴ ........................ F16C 19/10; F16C 33/58
[52] U.S. Cl. ..................................... 384/615; 384/622
[58] Field of Search ............... 384/513, 515, 537, 564, 384/569, 584, 609, 607, 615, 617, 618, 621, 620

[56] References Cited

U.S. PATENT DOCUMENTS

| | | | |
|---|---|---|---|
| 3,713,713 | 1/1973 | Alling et al. ...................... | 384/622 |
| 3,981,549 | 9/1976 | Carullo ................................ | 384/622 |
| 4,042,285 | 8/1977 | Dorsch ............................... | 384/621 |
| 4,400,041 | 8/1983 | Lederman ......................... | 384/607 |
| 4,497,523 | 2/1985 | Lederman ......................... | 384/615 |
| 4,552,467 | 11/1985 | Takei et al. ....................... | 384/615 |

*Primary Examiner*—Stuart S. Levy
*Assistant Examiner*—David Werner
*Attorney, Agent, or Firm*—Basile, Weintraub & Hanlon

[57] ABSTRACT

A pair of coupling members are symmetrically positioned either on the opposite outermost diametral edge portion or on the innermost diametral edge portion of a first bearing ring. The coupling members can be used as inserting members in assembly with a second ring. Alternatively, the pair of coupling members are positioned on an opposite outermost diametral bent portion or on an innermost diametral bent portion of the second bearing ring, so that the coupling members can be used as receptacle members in assembly with the first bearing ring. The second bearing ring is assembled through the coupling members, either on the opposite diametral outermost bent portion, or on the opposite diametral innermost bent portion of the first bearing ring to provide a non-separable type thrust rolling bearing.

15 Claims, 12 Drawing Figures

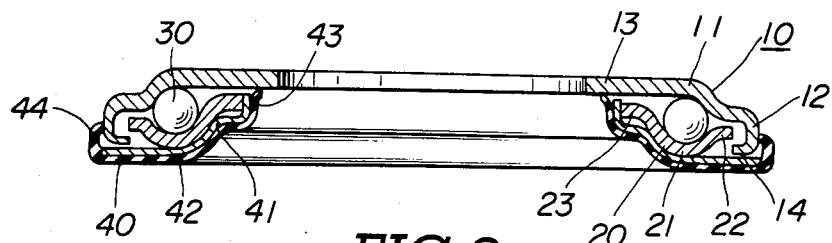
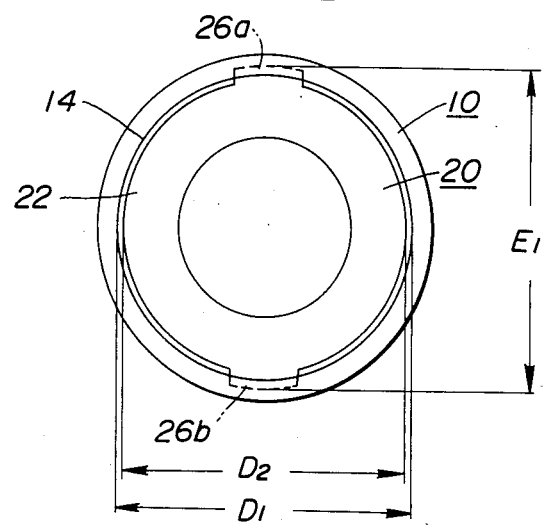
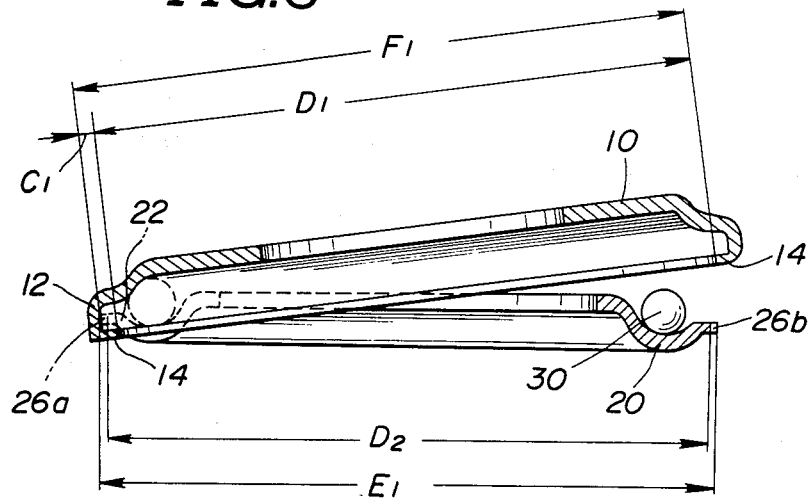

ular position on the outermost diametral edge of the first bearing ring.

NON-SEPARABLE THRUST ROLLING BEARING

BACKGROUND OF THE INVENTION

1. Field of the Invention

This invention relates to non-separable thrust rolling bearings. More particularly the present invention relates to a thrust rolling bearing, in which a pair of coupling members, for coupling a first bearing ring to a second bearing ring, are provided at diametrally opposed positions either on the outermost diametral edge or on the innermost diametral edge of the first bearing ring and the second bearing ring.

2. Description of the Prior Art

Heretofore, thrust ball or rolling bearings have widely been used, for example, as strut-type suspension bearings for vehicle wheels. It is well known that in a bearing of this type, all bearing components are assembled into an integral bearing construction which is capable of being handled and stored as a non-separable type of bearing. In the non-separable type of bearing, a bent portion is formed by bending either the outermost or the innermost diametral edge of the second bearing ring. The bent portion is laid on the outer side of either the outermost or the innermost diametral edge of the first bearing ring.

Japanese Laid Open Utility Model Publication No. Sho 59 (1984)-40618 discloses that a bending step is applied in one assembly process by using high frequency induction heating or hot curling, in order to lay the innermost or outermost edge of the second bearing ring, which has been subjected to a drawing operation and has been work hardened, on the first bearing ring. Since this type of bearing requires bending under heating in the assembly process, as mentioned above, the assembly step becomes complicated and thereby brings about not only an increase in man hours required to perform the assembly task, but also increases the cost for repayment of heating equipment and a consequent increase in production cost.

In accordance with the present invention and as noted hereinafter, the assembly of the two coupling members can be simplified by dispensing with a hot curling step on an end portion of the second bearing ring by making the coupling portion of the first bearing ring as socket. Alternatively, the hot curling step can be obviated by making the coupling portion of the second bearing ring as a receptacle.

SUMMARY OF THE INVENTION

The present invention aims to obviate the above mentioned drawbacks, and to provide a non-separable thrust rolling bearing. The inventive process dispenses with bending under heating or hot curling, thereby simplifying assembly and reducing production costs.

The non-separable thrust rolling bearing of the present invention solves the problem of prior art approaches by providing a pair of coupling members positioned on the opposite outermost or on the innermost diametral edge portions of a first bearing ring. Alternatively, the pair of coupling members may be positioned on the opposite diametral outermost bent portions or on the opposite diametral innermost bent portions of the first bearing ring.

Each of the coupling members on the first bearing ring is used as a plug-in socket coupling during the assembly with the second bearing ring. Each coupling member in the second bearing will act, during the assembly, as a receptacle into which the plug-in socket is inserted.

In a bearing completed by assembling the first bearing ring with the second bearing ring, as noted above, either the outermost or the innermost diametral edges of the first bearing ring are coupled, through the coupling portions, either to the outermost or to the innermost edges of the second bearing ring.

According to the present invention, not only can the assembly step be simplified, but also the second bearing ring can be prepared and used as a completed part with its innermost or outermost diametral bent portion having previously been formed and heat treated.

Consequently, the reheating or hot curling and bending step which heretofore has been indispensable, becomes unnecessary, thus enabling non-separable type thrust bearings to be manufactured with reduced production costs.

BRIEF DESCRIPTION OF THE DRAWING

FIG. 1 is a sectional view of the non-separable thrust rolling bearing of the present invention, provided with a bent portion at the outermost diametral end of the second bearing ring;

FIG. 2 is a plan view of the embodiment of the present invention shown in FIG. 1 wherein a pair of coupling members is provided on the first bearing ring;

FIG. 3 is a sectional side view of the present invention showing one of the assembly steps;

DETAILED DESCRIPTION OF THE PREFERRED EMBODIMENTS

Figure 4:
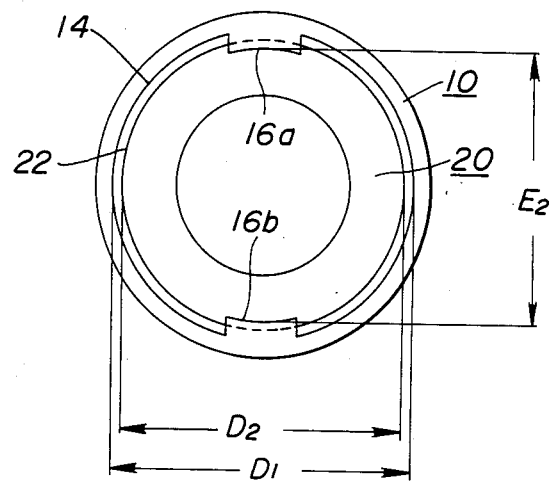
FIG. 4 is a plan view of a second embodiment of the present invention, wherein a pair of coupling members is provided on the second bearing ring.

Referring to the drawing and, in particular, to FIG. 1, there is shown a first embodiment of the present invention wherein a first bearing ring is coupled by means for coupling, such as coupling members, as described later herein, to the outermost diametral ends of the second bearing ring.

The second bearing ring 10 and the first bearing ring 20 of the first embodiment of the invention are fabricated by press-forming a thin steel sheet, and are assembled as a non-separable type of bearing by the steps of: (1) interposing a plurality of balls 30 between the first and second bearing rings 10 and 20; and (2) fitting a sealing member 40 from the side of the first bearing ring 20 to form an integrally constructed bearing.

The second bearing or bearing ring 10 comprises a raceway tracks 11, an outer diametral end portion or wall 12, and an inner diametral end portion or wall 13. The outer diametral end portion 12 is radially and inwardly bent at its outermost end to define a bent portion 14.

The first bearing ring 20, also, comprises a raceway track 21, an outer diametral end portion or wall 22, an inner diametral end portion or wall 23. Both the outer and the inner diametral end portions are formed as annular rings, normal to the rotational axis of the bearing.

The sealing member 40 is integrally formed on the core metal 41 by vulcanizing a rubber-like elastomer 42. Inside lip 43 of the sealing member 40 slidably contact the inner diametral end 13 of the second bearing ring 10, while the outside lip 44 of the sealing member 40 slidably contact the outside face of the outer diametral end portion 12.

The outermost edge of the outer diametral bent portion or edge 12 of the second bearing ring 10 and the outermost diametral end or edge portion 22 of the first bearing ring 20 are circular. The outside diameter D2 of the diametral outer side of the first bearing ring 20 is made shorter than the inside diameter D1 of the bent portion 14 of the second bearing ring 10.

Referring now to FIGS. 2 and 3 there is shown therein the means for coupling. According to this embodiment the means for coupling comprises opposed coupling members 26a and 26b. The coupling members 26a, 26b are formed on the outermost end portion 22 of the first bearing ring 20. The coupling members 26a, 26b are radially and outwardly directed and, each has a rectangular shape. The outermost edge of these coupling members 26a and 26b is preferably formed with a convex arc, having a radius of curvature equal to that of the diametral outermost edge of the second bearing ring 10. The distance between the two opposing edges (opposing distance) E1 of the coupling members 26a and 26b is made slightly longer than the inside diameter D1 of the opposing bent portion 14 of the second bearing 10. The distance E1 is either shorter than, or almost the same as, the length F1, where F1 is the sum of the inside diameter D1 and the radial length C1 of the bent portion 14, measured from the inner base of the outer diametral end portion 12 of the second bearing member 10. The above-mentioned dimensional relationship can be expressed by the following formula or equation:

$$D2 < D1 < E1 < \text{ or } \approx F1 = D1 + C1.$$

In assembling the second bearing 10 and the first bearing 20 by arraying bearing balls 30 therebetween, the first bearing ring 20 is placed in an inclined position with respect to the second bearing ring 10, as shown in FIG. 3. The coupling portion 26a on one side of the innermost diametral edge 22 of the first bearing ring 20 is inserted into the outermost diametral edge 12 of the second bearing ring 10. In this manner, the outer extremity of the coupling member 26a can fit up to the inner face of the outermost diametral end portion 12 of the second bearing 10. The coupling member 26b at the other side of the first bearing ring 20 is fitted into the opposing end portion at the opposite side of the outermost diametral bent portion 14 of the second bearing ring 10.

Since it is inevitable that there arises some relative dimensional difference between the E1 and F1 distances, the method of insertion may include a transition fit that is either a forced fit, or a clearance fit with no interference. In either case, the rotational axis of each of the two bearing rings are aligned after the first bearing ring has been fitted into the second bearing ring and, thus, the assembly can be completed.

As a consequence, the coupling members 26a and 26b of the first bearing ring 20 are coupled to the outermost diametral bent portion 14 of the second bearing ring 10.

Since the ball bearing disclosed above is constructed to have its distance E1 between the opposing tip ends of the coupling members 26a and 26b larger than the inside diameter D1 of the two opposing tip ends of the bent portion 14 of the second bearing ring, the assembled bearing can be handled as a complete, non-separable type bearing.

Figure 5:
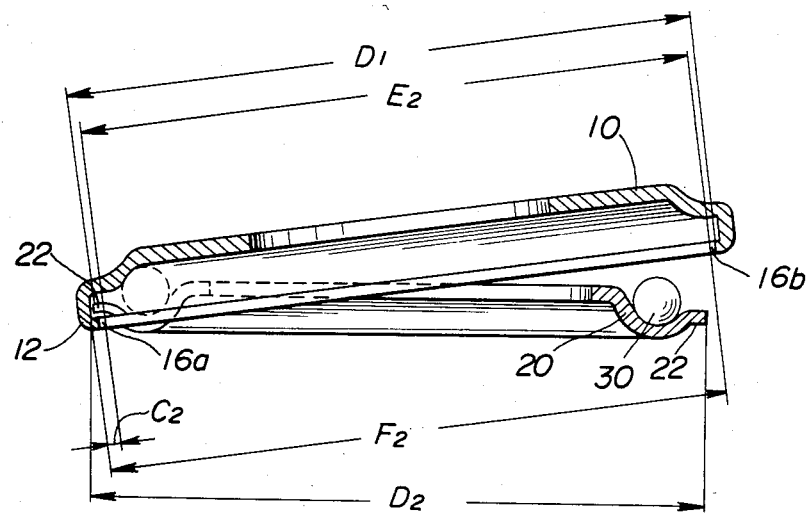
FIG. 5 is a sectional view showing one of the assembly steps of the bearing shown in FIG. 4.

In FIGS. 4 and 5, a second embodiment of the present invention is shown wherein a pair of coupling members 16a, 16b, respectively, is disposed on the outermost diametral bent portion of the second bearing ring. The coupling members 16a and 16b are provided, respectively, on the radial inner face of the two opposing diametral outer ends of the second bearing 10. The tip end of each of the coupling members 16a and 16b is formed to have an arched concave shape and having a radius of curvature preferably the same as that of the outermost diametral edge of the first bearing ring 20.

The length E2 between the opposing tip ends of the coupling members 16a and 16b is slightly smaller than the outside diameter D2 of the first bearing ring 20.

The outside diameter D2 at the outermost diametral end portion of the first bearing ring 20 is shorter than, or almost the same as the total length F2. The length F2 is obtained by adding the radial protrusion length C2 of the coupling member from the inner face of the outermost edge portion of the second bearing member 10, to the opposing distance E2 of the coupling members 16a and 16b.

The above-mentioned dimensional relationship can be expressed by the following formula:

$$E2 < D2 < \text{ or } \approx F2 = E2 + C2; \text{ and } D2 < D1.$$

When the second bearing ring 10 and the first bearing ring 20, as constructed above, are assembled together, the outermost diametral end portion 22 of the first bearing ring 20 is passed through the tip end of the coupling member 16a at one side of the second bearing ring 10, so as to fit up to the inner face at the innermost diametral end portion 12. The outermost diametral end portion 22 at the opposite side of the first bearing ring 20, is fitted into the gap defined by the coupling member 16b at the other side of the second bearing ring 10. By inserting the first bearing ring 20 into the second bearing ring 10, as explained above, the outermost diametral end portion 22 of the first bearing ring 20 is coupled to the coupling members 16a and 16b of the second bearing ring 10.

Since the ball bearing constructed as disclosed above has the distance E2 between the coupling members 16a and 16b shorter than the outside diameter D2, the assembled bearing can be handled as a completely non-separable type bearing.

Figure 6:
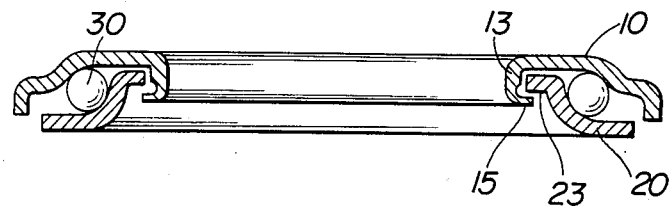
FIG. 6 is a sectional view of a third embodiment of the present invention, provided with a portion on the innermost diametral edge of the second bearing ring.

Referring now to FIG. 6 there is shown a third embodiment of the present invention. According to this embodiment, the innermost diametral portion of the second bearing ring 10 defines means for coupling with the first bearing ring 20.

As shown in the drawing, at each of the two opposing innermost diametral end portions 13 of the second bearing 10, there is provided a bent portion 15, formed by bending the inner end portion in a radially outward direction.

Figure 7:
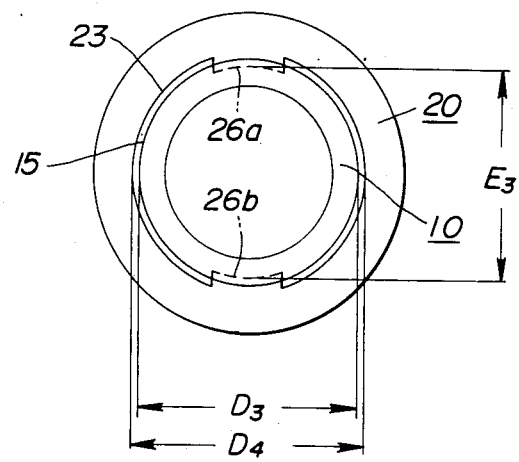
FIG. 7 is a plan view of the third embodiment of the present invention wherein a pair of coupling members is disposed on the first bearing ring.
Figure 8:
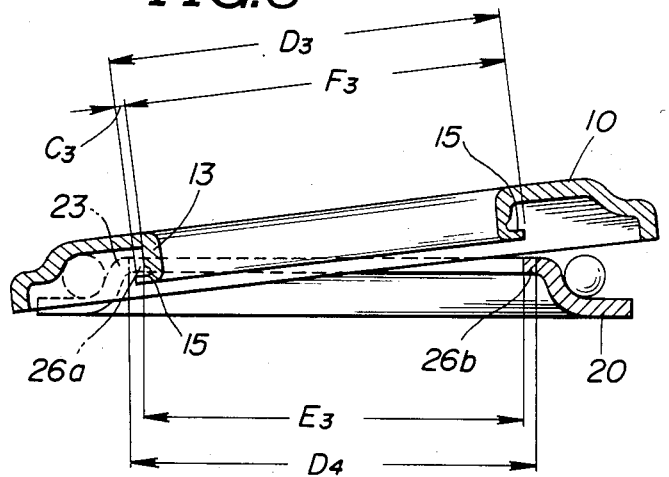
FIG. 8 is a sectional view showing one of the assembly steps of the bearing of FIG. 7.

FIGS. 7 and 8 show the third embodiment of the present invention wherein a pair of coupling members 26a, 26b is disposed on the innermost diametral end rim of the first bearing ring 20. The edge of the innermost diametral end portion 23 has an inside diameter D4 longer than the outside diameter D3 of the bent portion 15 formed on the innermost diametral end portion of the second bearing ring 10.

The coupling members 26a and 26b, are formed radially and inwardly at the opposing inner diametral end portion of the first bearing ring 20. The forward tip end of each of these coupling members 26a, 26b has a concave, arched profile and, preferably, a radius of curvature equal to that of the diametral inner edge of the second bearing ring 10. The length E3 between each forward tip end of the two opposing coupling members 26a, 26b is slightly shorter than the outside diameter D3 of the bent portion of the second bearing ring 10. The distance E3 is shorter than or equal to the length F3, where F3 is obtained by subtracting (a) the radial length C3 of the bent portion 15 stemming out from the surface of the inner diametral wall portion 13 from (b) the outside diameter D3 of the bent portion of the second bearing ring 10.

The aforesaid dimensional relationships are expressed by the formula:

$$D4 > D3 > E3 \text{ or } \approx F3 = D3 - C3.$$

In assembling the second bearing ring 10 to the first bearing ring 20, according to this embodiment, the first bearing ring 20 is placed in contact with, and inclined to the second bearing ring 10. The coupling member 26a, formed at one side of the innermost diametral portion 23 of the first bearing ring 20, is inserted into a gap defined by the innermost diametral end portion 13 of the second bearing ring 10. The coupling member 26a is further fitted up to the inner face of the innermost diametral end portion of the second bearing ring 10. The coupling member 26b, at the other side of the first bearing ring 20, is fitted into the opposite end portion of the innermost diametral bent portion 15 of the second bearing ring 10.

By assembling in the manner as mentioned above, the coupling members 26a and 26b of the first bearing ring 20 are tightly coupled to the innermost diametral bent portion 15 of the second bearing ring 10.

Since the opposing distance E3 between the coupling members 26a and 26b is longer than the outside diameter D3 of the bent portion 15 on the innermost diametral end portion 13 of the second bearing ring 10, the ball bearing so-constructed defines a complete non-separable type bearing.

Figure 9:
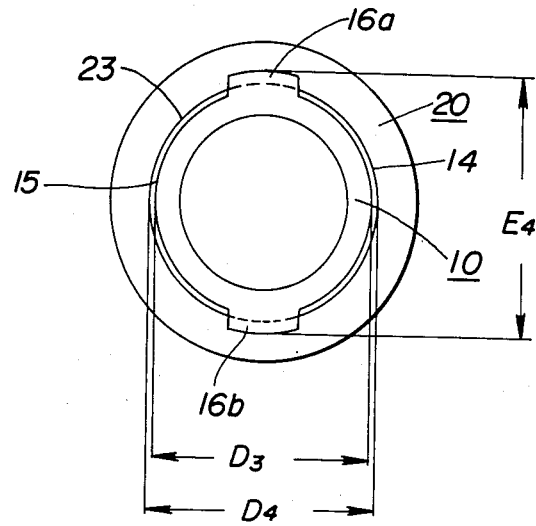
FIG. 9 is a plan view of a fourth embodiment of the ball bearing shown in FIG. 6, wherein a pair of coupling members is provided on the second bearing ring.
Figure 10:
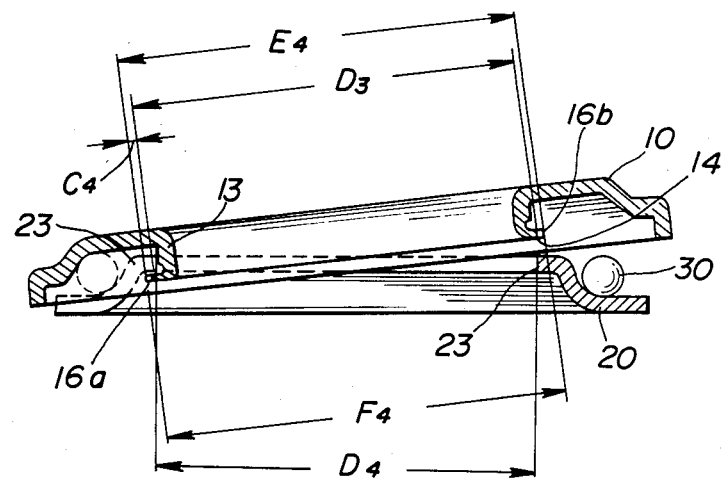
FIG. 10 is a sectional view showing the assembly of the bearing shown in FIG. 9.

FIGS. 9 and 10 show a fourth embodiment of the present invention, wherein coupling members 16a, 16b are provided on the bent portion 14 at the innermost diametral end portion of the second bearing ring 10. The coupling members 16a, 16b project radially outwardly from the innermost diametral end portion of the second bearing ring 10. The forward tip end of each coupling member 16a and 16b has a concave arched periphery, and preferably has a radius of curvature equal to that of the inside rim of the first bearing ring 20.

The distance E4 between the opposing forward tip ends of the coupling members 16a and 16b is slightly longer than the inside diameter D4 of the first bearing ring 20. The outside diameter of the bent portion 14 formed on the innermost diametral end portion of the second bearing ring 10 has a distance D3. The inside diameter D4, at the innermost diametral end portion of the first bearing ring 20, is longer than, or almost the same as, a length F4. The length F4 is obtained by subtracting from the opposing distance E4 between the coupling members 16a and 16b, the radial protrusion length C4 from the root of the bent portion 14.

The dimensional relationship mentioned above can be expressed as follows:

$$E4 > D4 > \text{ or } \approx F4 = E4 - C4; \text{ and } D4 > D3.$$

In assembling the second bearing ring 10 and the first bearing ring 20 of this embodiment, the diametral inside end portion 23 of the first bearing ring 20 is passed over the forward tip end of the coupling member 16a at one side of the second bearing ring 10. The coupling member 16a is inserted into the gap defined in the innermost diametral end portion 13 and is fitted to the inner face 13 of the coupling member 16a. The innermost diametral end portion 23 of the coupling member of the first bearing ring 10, opposite to the coupling member 16a which has already been fitted, is inserted into the other coupling member 16b. By assembling the bearing in this manner, the innermost diametral end portions of the first bearing ring 20 are coupled to the coupling members 16a and 16b, respectively. Since the ball bearing of the construction as explained above has coupling members 16a and 16b spaced apart at a distance E4, which is longer than the inside diameter D4 of the first bearing member 20, the bearing can be made as a completely non-separable type.

Figure 11:
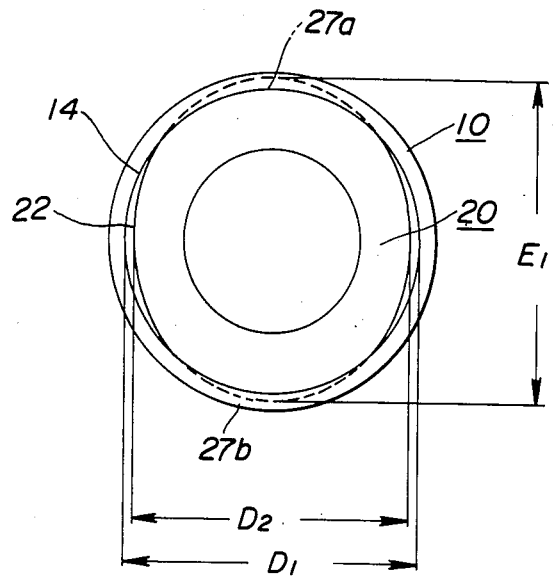
FIGS. 11 and 12, respectively, are plan views of a fifth and sixth embodiments of the invention, wherein a bent portion is provided on the outermost diametral edge of the second bearing ring.

FIG. 11 shows a further embodiment of the present invention which resembles that shown in FIG. 2. Although the end periphery of the outermost diametral bent portion 14 of the second bearing ring 10 is formed as a circle, the outer periphery of the outermost diametral end portion of the first bearing ring 20 is formed as an ellipsoid or oval shape. The ellipsoid has a short axis D2 and a long axis E1. The length of the short axis D2 is shorter than the inside diameter D1 of the bent portion at the outermost diametral end portion. The length of the outer diameter E1 is longer than the inside diameter D1 of the bent portion of the second bearing ring 10. However, the length E1 of the long axis of the outermost diametral portion is shorter than, or almost equal to, the sum of the radial length of the bent portion 14, measured from the innermost diametral end portion, and the inside diameter D1 of the second bearing ring 10.

By virtue of this, the coupling members 27a and 27b, disposed or formed on the two opposite edges of the long axis of the outermost diametral end of the first bearing ring 20, become plug portions to be inserted to the second bearing ring 10.

In assembling the second bearing ring 10 to the first bearing ring 20, both rings are constructed as mentioned above, and can be made in the same manner as already explained in connection with FIG. 3.

Figure 12:
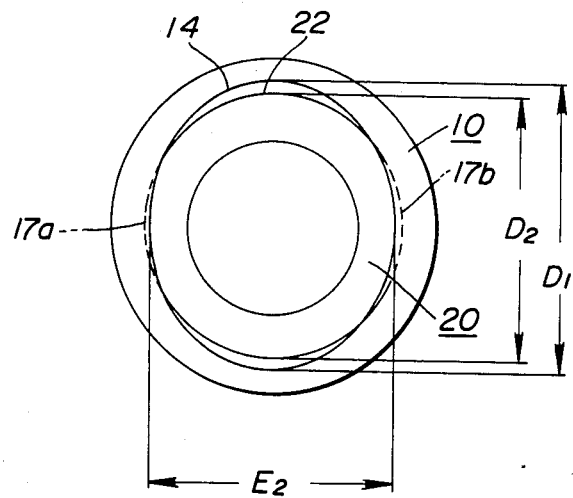

FIG. 12 shows a still further embodiment of the present invention which resembles that shown in FIG. 4, but which is different from that shown in FIG. 11, in that the outermost diametral end portion of the first bearing ring 20 is circular, while the outermost diametral end portion of the second bearing ring 10 is formed an an ellipsoid.

The bent portion 14 formed on the outermost diametral end portion of the second bearing ring 10 is formed an an ellipsoid with its inner diametral short axis having a length E2 and its inner diametral long axis having a length D1. The length of the long axis D1 is longer than the diameter D2 of the outer diameter side of the first bearing ring 20. The length of the short axis E2 on the innermost diametral edge is shorter than the diameter D2 of the outer diametral end of the first bearing ring 20. In addition, the diameter D2 of the outermost diametral end of the first bearing ring 20 is, as explained by referring to FIG. 5, shroter than, or almost the same as, the length obtained by adding the length of the inner diametral top portion in the direction of the inner diametral short axis, measured from the inner face of the outermost diametral end portion, and the length of the inner diameter side short axis of the second bearing ring 10.

By virtue of this construction, a pair of coupling members 17a, 17b, respectively, is formed on the two opposite top points of the outermost diametral end portion of the second bearing ring 10. The coupling members 17a, 17b define portions to be inserted in the assembly process, with respect to the first bearing ring 20. Assembly of the second bearing ring 10 and the first bearing ring 20, both of which are constructed as mentioned above, can be performed in a similar manner to that explained in connection with FIG. 5.

The embodiments shown by FIGS. 11 and 12 can be similarly applied, where the first bearing ring is coupled to the innermost diametral side of the second bearing ring 10.

As to the configuration of the outermost diametral end and the innermost diametral end, either one or both of them may be formed as curved configuration other than ellipsoid, or they can be made as a combination of various kinds of curved configurations other than a circle. Alternatively, they can be made as a combination of various kinds of curved shapes and linear sections. Even when the end portions are formed into a shape other than a circle, the non-separable type ball bearing of the present invention can be obtained by providing a pair of coupling members on the portions almost symmetrical with each other, either on the outermost diametral end portion, or on the innermost diametral end portion of either one of the bearing rings, and by establishing the requisite dimensional relationships disclosed herein, between the opposing distance of the coupling members and the opposing distance of the end portions.

Having thus, described the invention, what is claimed is:

1. A non-separable thrust rolling bearing having a rotational axis comprising:
   first and second annular bearing rings each having an inner and an outer dimetral end portion respectively;
   a bent portion formed on an end of one of the inner and outer diametral portions of the second bearing ring and extending radially in a direction toward the other of the inner and outer diametral portions thereof, said bent portion being proximate one of the inner and outer diametral edge portions of the first bearing ring; and
   a pair of opposed coupling members integrally formed on an end of one of the inner and outer diametral end portions of the one of the first and second bearing rings and having a radial width greater than the difference between the diameters of the bent portion as measured at the greatest radial extension thereof and of the one of the inner and outer diametral edge portions of the first bearing ring proximate the bent portion.

2. The non-separable thrust rolling bearing of claim 1, wherein the bent portion of the second bearing ring is proximate the outermost diametral end portion of the first bearing ring.

3. The non-separable thrust rolling bearing of claim 1, wherein the bent portion of the second bearing ring is proximate the innermost diametral end portion of the first bearing ring.

4. The non-separable thrust rolling bearing of claim 2, wherein the pair of coupling members are formed on the outermost diametral edge portion of the first bearing ring, the coupling members being insertable into the second bearing ring.

5. The non-separable thrust rolling bearing of claim 3, wherein the pair of coupling members are formed on the innermost diametral edge portion of the first bearing ring, the coupling members being insertable into the second bearing ring.

6. The non-separable thrust rolling bearing of claim 2, wherein the pair of coupling members are formed on the outermost diametral bent portion of the second bearing ring, the coupling members defining receptacle members when assembled with the first bearing ring.

7. The non-separable thrust rolling bearing of claim 3, wherein the pair of coupling members are formed on the innermost diametral bent portion of the second bearing ring, the coupling members defining receptacle members when assembled with the first bearing ring.

8. The non-separable thrust rolling bearing of claim 6, wherein the second bearing ring comprises means for coupling opposite sides of the diametral outermost portion of the first bearing ring, the means for coupling engaging the first bearing ring to define an assembled rolling bearing.

9. The non-separable thrust rolling bearing of claim 7, wherein the second bearing ring comprises means for coupling opposite sides of the diametral innermost portion of the first bearing ring, the means for coupling engaging the first bearing ring to define an assembled rolling bearing.

10. The non-separable thrust rolling bearing of claim 1, wherein the pair of coupling members are formed on the outermost diametral end portion of the first bearing ring such that a dimensional relationship is established, expressed by a formula:

$$D2 < D1 < E1 < \text{ or } \approx F1 = D1 + C1,$$

where:
   D1 is the inside diameter of the bent portion, each disposed on the opposite outermost diametral end portion of the second bearing ring;
   D2 is the outside diameter of the outermost diametral end portion of the first bearing ring;
   E1 is the opposing distance between the opposing tip ends of the coupling members;
   C1 is the radial length of the bent portion from the inner face at the outermost diametral end portion of the second bearing ring; and
   F1 is the sum of the radial length C1 and the inside diameter D1.

11. The non-separable thrust rolling bearing of claim 1, wherein the pair of coupling members are formed on the outermost diametral end portion of the second bearing ring such that a dimensional relationship is established expressed by a formula:

$$E2 < D2 < (\text{or} \approx) F2 = E2 + C2; \text{ and } D2 < D1,$$

where:
- D1 is the inside diameter of the bent portion, each disposed on the opposite outermost diametral end portion of the second bearing ring;
- D2 is the outside diameter at the outermost diametral end portion of the first bearing ring;
- E2 is the distance between the opposing two coupling members;
- C2 is the radial length of protrustion from the inner face of outermost diametral end portion of the second bearing ring; and
- F2 is the sum of the radial length of protrusion C2 and the inside diameter D1.

12. The non-separable thrust rolling bearing of claim 1, wherein the pair of coupling members are formed on the innermost diametral end portion of the first bearing ring such that a dimensional relationship is established, expressed by a formula:

$$D4 > D3 > E3 < (\text{or} \approx) F3 = D3 - C3,$$

where:
- D3 is the outside diameter at the innermost diametral end portion of the second bearing ring;
- E3 is the opposing distance between the opposing tip ends of the coupling members;
- C3 is the radial length of each of the bent portion of the second bearing ring from the outer face of the innermost diametral end portion;
- F3 is the length obtained by subtracting the radial length C3 from the outside diameter of the bent portion D3; and
- D4 is the diameter at the innermost diametral end portion of the first bearing ring.

13. The non-separable thrust rolling bearing of claim 1, wherein the pair of coupling members are formed on the innermost diametral end portion of the second bearing ring such that a dimensional relationship is established, expressed by a formula:

$$E4 > D4 > (\text{or} \approx) F4 = E4 - C4; \text{ and } D4 > D3,$$

where
- D3 is the outside diameter of the bent portion on the innermost diametral end portion of the second bearing ring;
- E4 is the distance between the opposing tip ends of the coupling members;
- C4 is the radial length of protrusion of the coupling member from the bent portion of the second bearing ring;
- F4 is the length obtained by subtracting the radial length of protrusion C4 from the opposing distance E4; and
- D4 is the diameter at the innermost diametral end portion of the first bearing ring.

14. The non-separable thrust rolling bearing of claim 1, wherein:
- the first bearing ring is ellipsoidal;
- the outermost diametral end portion of the first bearing ring define the pair of coupling members;
- the outermost diametral end portions are smaller than the inside diameter of the second bearing ring; and
- wherein the outermost diametral end portions are larger than the inside diameter of the bent portion of the second bearing ring.

15. The non-separable thrust rolling bearing of claim 1, wherein:
- the second bearing is ellipsoidal;
- the outermost diametral end portions of the second bearing define pair of coupling members;
- the innermost end portions are shorter than the outside diameter of the first bearing ring; and
- wherein the second bearing is larger than the outside diameter of the first bearing ring.

* * * * *